C. A. RHONEMUS.
SHEET GLASS DRAWING MACHINE.
APPLICATION FILED APR. 19, 1919.
1,391,405.
Patented Sept. 20, 1921.
4 SHEETS—SHEET 1.
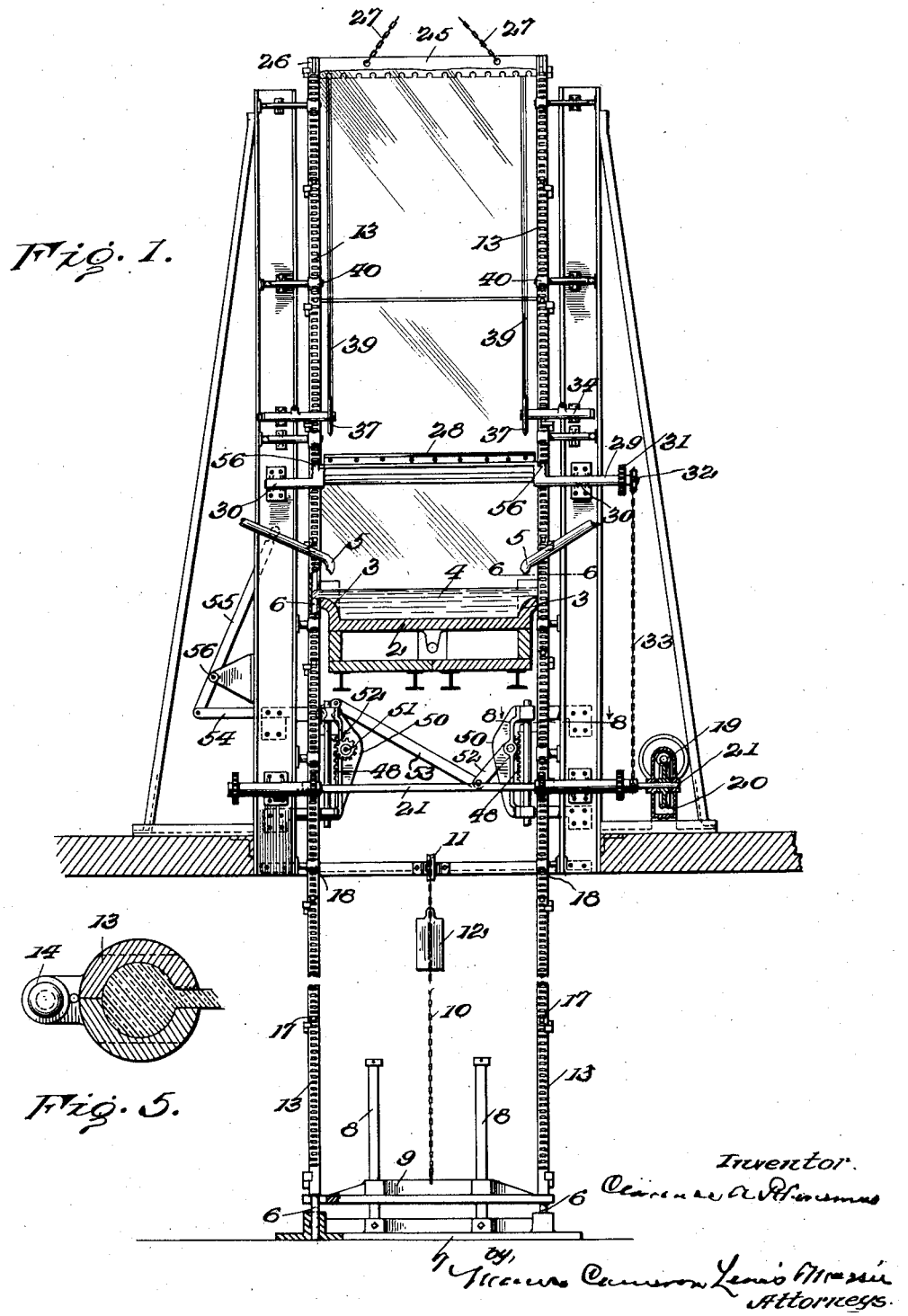

C. A. RHONEMUS.
SHEET GLASS DRAWING MACHINE.
APPLICATION FILED APR. 19, 1919.
1,391,405.
Patented Sept. 20, 1921.
4 SHEETS—SHEET 2.
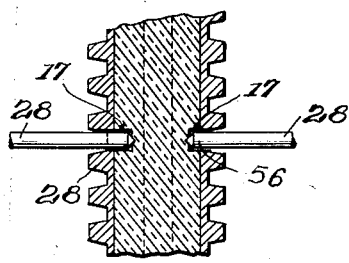
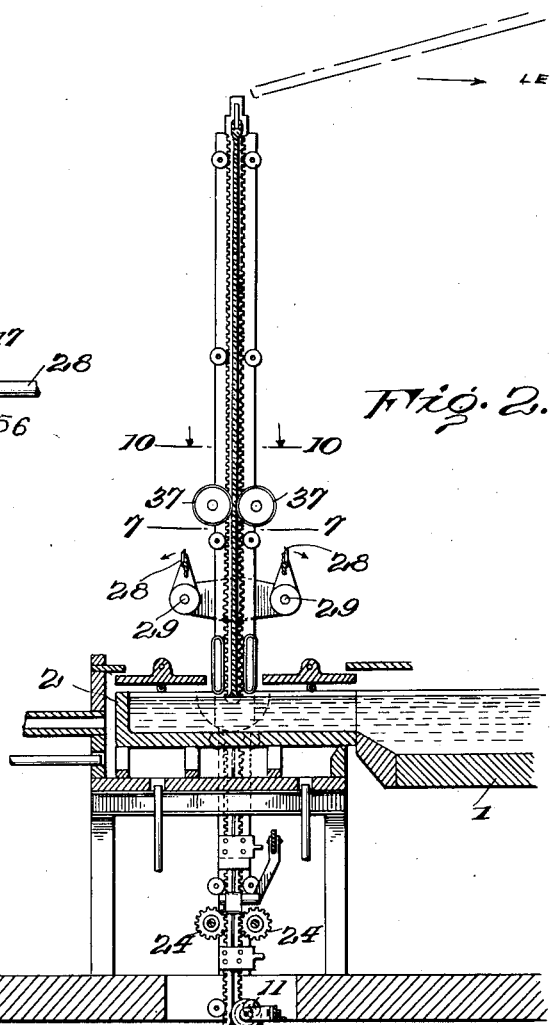
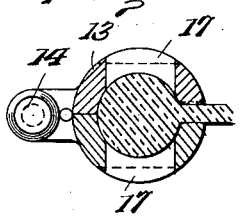

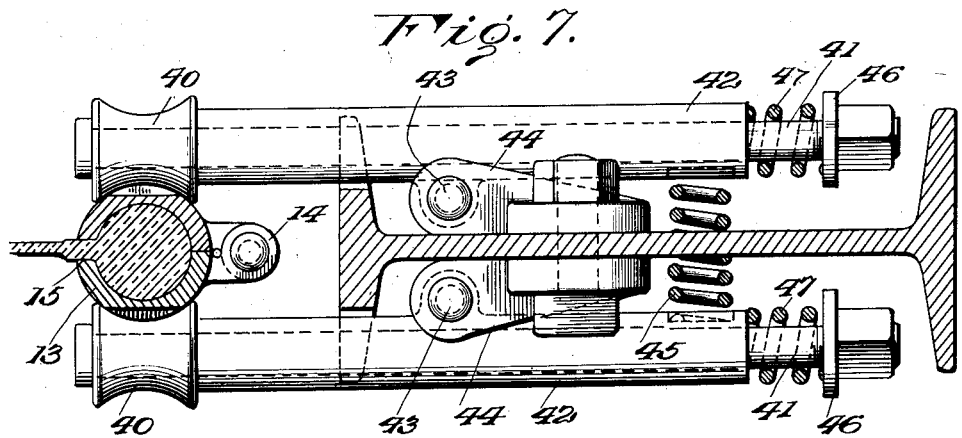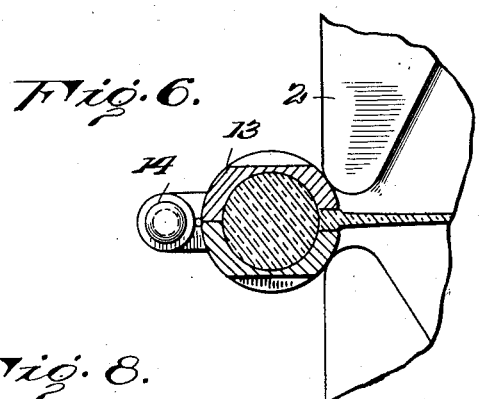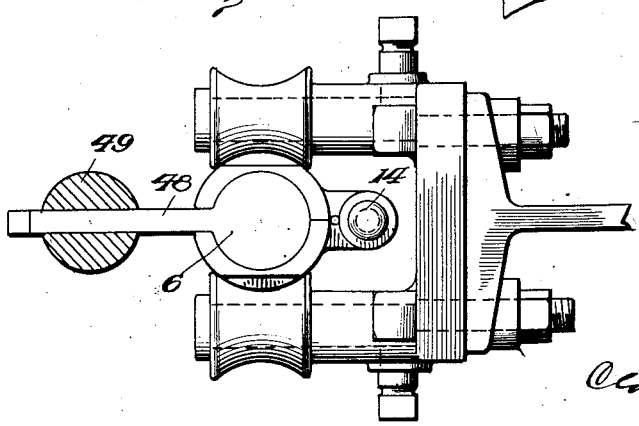

C. A. RHONEMUS.
SHEET GLASS DRAWING MACHINE.
APPLICATION FILED APR. 19, 1919.
1,391,405.
Patented Sept. 20, 1921.
4 SHEETS—SHEET 4.
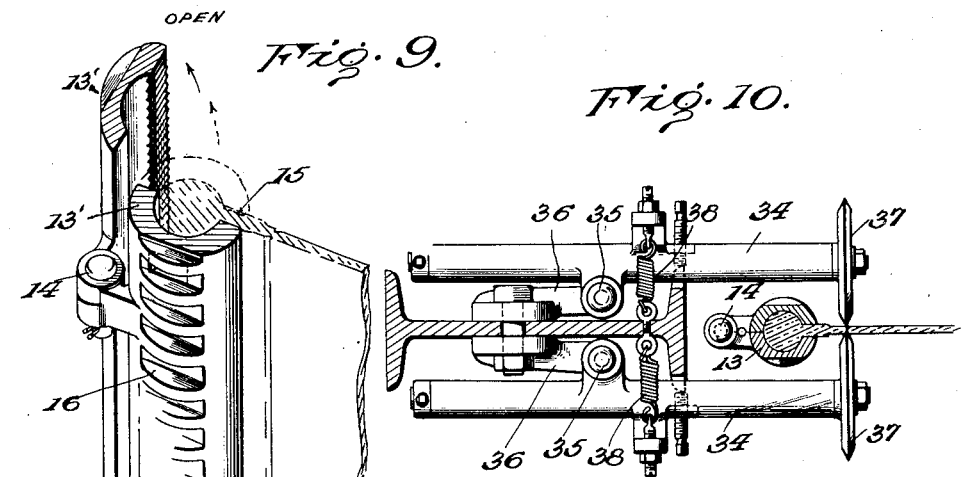
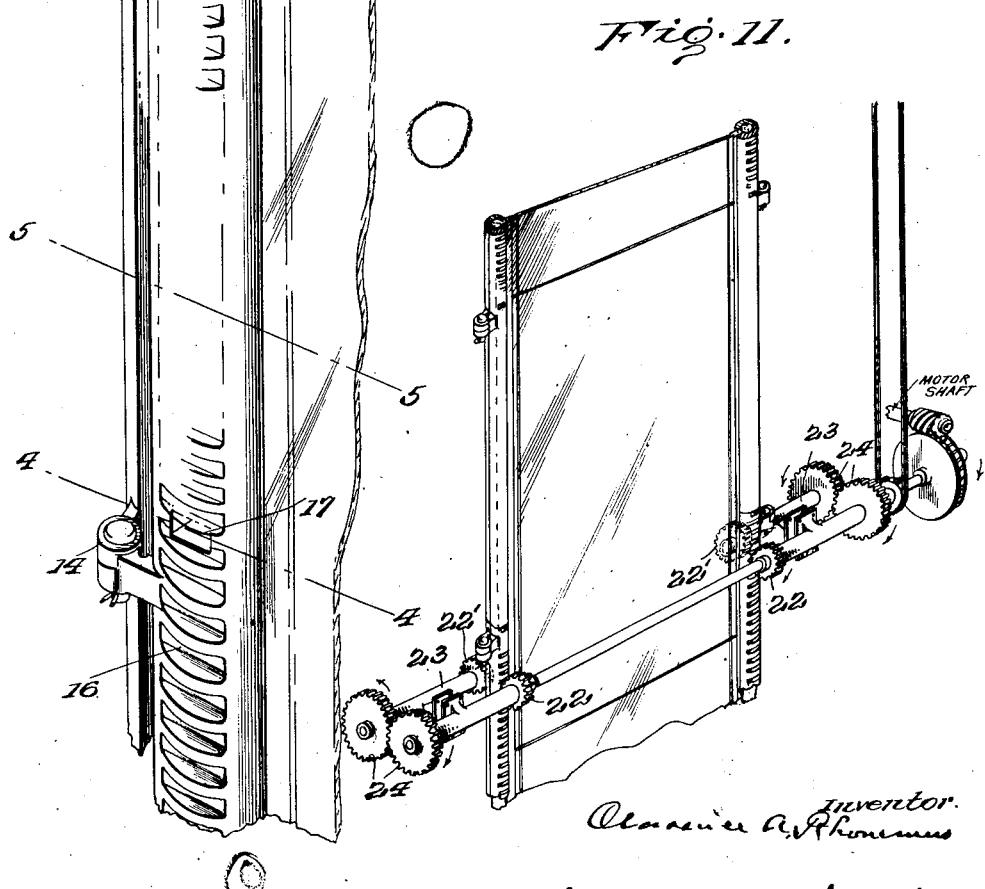

UNITED STATES PATENT OFFICE.

CLARENCE A. RHONEMUS, OF CHARLESTON, WEST VIRGINIA, ASSIGNOR TO THE LIBBEY-OWENS SHEET GLASS COMPANY, OF TOLEDO, OHIO, A CORPORATION OF OHIO.

SHEET-GLASS-DRAWING MACHINE.

1,391,405. Specification of Letters Patent. Patented Sept. 20, 1921.

Application filed April 19, 1919. Serial No. 291,214.

*To all whom it may concern:*

Be it known that I, CLARENCE A. RHONEMUS, a citizen of the United States of America, resident of Charleston, West Virginia, have invented a new and useful Improvement in Sheet - Glass - Drawing Machines, which invention is fully set forth in the following specification.

This invention relates to the art of drawing sheet glass, and has for its object to provide means for the continuous drawing of the glass in sheet form and severing it into sections during the drawing operation.

In order to "draw" the glass in sheet form from a mass of molten glass, a strip of metal or other suitable material, technically called "a bait", is lowered into the molten mass and then slowly raised therefrom, the glass following the bait in sheet form. In this drawing operation, the glass tends to rapidly narrow to a string or thread which would become severed from the molten mass and the drawing operation thus interrupted before a sheet of any commercial value was formed, and it is therefore necessary to provide means for overcoming this narrowing tendency of the sheet during the drawing operation if a continuous sheet, or one of any practical size, is to be drawn.

By the present invention, there is provided any suitable receptacle for molten glass, preferably in the form of a pot in open communication with a glass-melting furnace, which pot is provided with means for maintaining the desired temperature of the molten glass, and on opposite sides of the pot overflow points are provided at approximately the level of the molten glass, and in reality slightly below the level, through or over which small lateral streams overflow outwardly, which streams of outwardly flowing glass are received by vertically moving tubes or channels The overflow portions preferably are in the form of overflow lips, and the glass-receiving tubes are divided into longitudinal sections which are hinged together in such way as to leave a vertical longitudinal slot in the tube. As the molten glass overflows from the lips on opposite sides of the pot, it enters the tubes through the slots, and as the tubes move vertically upward, they act to counteract the narrowing tendency of the sheet and thereby maintain it of a uniform width.

Means are provided for simultaneously elevating the slotted tubes and for transversely scoring the sheet of glass at stated intervals while it is still plastic enough to be scored without breaking. There are also provided, near each edge portion of the sheet, devices which form longitudinal scores substantially parallel with the edge of the glass.

When the sheet has reached a sufficient length and has cooled to the point where it may be readily handled, the top portion thereof is inclined to one side, either manually or by any suitable mechanism, thereby cracking or breaking the upper section from the sheet along one of the transversely scored lines that falls opposite the ends of a pair of tubes. The scored edge portions are then cracked off and, if the sheet has been transversely scored between the tube ends, the sheet is cracked along the transverse score line or lines, thus dividing it into smaller sheets which are transferred to a suitable leer for annealing.

The invention also resides in certain specific combinations and arrangements of parts which will be hereinafter more definitely described.

The inventive idea may receive a variety of mechanical expressions one of which is shown on the accompanying drawings in which—

Figure 1 is an end elevation of the apparatus, parts being shown in section.

Fig. 2 is a vertical section of Fig. 1, parts being shown in elevation.

Fig. 3 is a detail fragment of one of the side holding tubes, showing the transverse scores entering openings therein.

Fig. 4 is a horizontal section on the line 4—4, Fig. 9.

Fig. 5 is a horizontal section on the line 5—5, Fig. 9.

Fig. 6 is a horizontal section through one of the side-retaining tubes, on the line 6—6, Fig. 1, showing the overflow lip in plan.

Fig. 7 is a horizontal sectional view on the line 7—7, Fig. 2.

Fig. 8 is a plan view on the line 8—8, Fig.

1, parts being shown in section and certain other parts omitted for clearness of illustration.

Fig. 9 is a broken perspective of one of the side retaining tubes.

Fig. 10 is a horizontal sectional view on the lines 10—10, Fig. 2.

Fig. 11 is a detail perspective of the driving mechanism and pinions for operating the side retaining tubes.

Referring to Figs. 1 and 2, 1 is any suitable glass melting tank in open communication with a drawing pot or chamber 2, said pot or chamber being provided with the usual or any suitable means for maintaining the proper temperature of the molten glass. As such temperature-regulating means form no essential part of the present invention they need not be further described. The drawing pot or chamber 2 is provided, on the opposite sides thereof, with two corresponding overflow portions or lips 3—3, slightly below the normal level of the molten glass 4 in the pot 2, to the end that the molten glass may flow outward over such lips and be discharged therefrom. Suitable burners 5—5, or any other suitable means, are provided for maintaining the temperature of the glass at these overflow portions or lips at the proper degree for drawing.

Beneath the pot 2, and outside the marginal limits thereof, are mounted two vertical rods 5 movable in sockets in a foundation 7, said rods being projected upward, with their upper ends adjacent to the outer edges of the overflow lips 3, the upper ends of the rods being slightly below the surface of the overflow or discharge lips during the drawing operation. 8—8 are two fixed vertical guide rods, secured in foundation 7 and serving as guides for the follower 9 in the form of a casting, to which follower is attached a chain 10 passing over a pulley 11, having a weight 12 secured to the depending end thereof. 13—13 are slotted tubes formed of semi-cylindrical sections 13'—13', Fig. 9, hinged together by hinges 14. The sections when in closed position, form a tube, leaving a corrugated slot 15. These tubes 13 are also provided, on the opposite sides thereof, with rack teeth 16 and at stated intervals, with oppositely disposed openings 17 for a purpose which will be hereinafter described. These tubes 13 are opened out and then closed around the rods 6—6, with their lower ends resting on the follower 9 when the latter is in its lowermost position shown in Fig. 1. Under the influence of the weight the follower is elevated, lifting the tubes 13 with it, said tubes being guided by the rods 6 and by idle rolls 18 mounted on the framework.

A suitable motor shaft 19 is geared, preferably by worm gear 20, to a shaft 21, mounted in suitable bearings on the framework, said shaft 21 extending across the machine (see Fig. 11) and having thereon pinions 22—22, for engaging the rack teeth on the tubes 13. There are two of these pinions on shaft 21, one near each edge portion of the sheet to be drawn. On each side of the machine the shaft 21 is geared to a stub-shaft 23, by gearing 24, each of which stub shafts carries a pinion 22' for engaging the rack teeth 16 on the opposite sides of the tubes 13 from those engaged by the pinions 22—22. By this means, the tubes 13 are elevated with their open slots 15 passing in close contact with the outer edges of the discharge or overflow lips 3—3, and as they pass these overflow lips the molten glass flows to the interior of the tubes through the slits 15, the downward flow of the glass being limited by the upper ends of the rods 6.

Referring to Fig. 1, 25 is any suitable bait, preferably provided on the ends thereof with pins 26 for entering the openings in the upper ends of the tubes 13. Said bait is also preferably provided with a bridle 27 to facilitate the handling of the same when lowering it into position to initiate the drawing operation. The bait 25 is lowered so that its lower edge projects below the surface of the molten glass 4 with the pins 26 in position to enter the upper ends of the tubes 13. The parts being thus positioned and the bait having remained in the glass long enough for the same to become attached thereto, the bait is slowly elevated, together with the slotted tubes 13 through the operation of the racks on said tubes and the pinions engaging the same.

*Transverse scoring mechanism.* — Referring to Figs. 1 and 2, 28—28 are scoring blades mounted on shafts 29—29 turning in bearings 30, on the framework of the machine, said bearings for the two shafts being disposed on opposite sides of the drawn sheet and the two shafts being geared together by engaging gears on the shaft, one of which is shown at 31, Fig. 1. One of the shafts 29 is provided with a sprocket wheel 32, over which passes a sprocket chain 33, driven from the shaft 21. The two blades 28 revolve in opposite directions and the parts are so proportioned that they meet, or very nearly meet, in a horizontal plane between the two shafts 29—29. These blades being placed in a position but slightly above the drawing point of the sheet, they engage the same while it is still plastic and score the opposite sides of the sheet along a line on which the sheet may subsequently be broken as hereinafter described.

Referring to Figs. 2 and 3, when the transverse scoring devices 28 are operated to score the glass sheet transversely, scoring elements 56 enter the opening 17 in the sides of the tubes 13 and act to score the bead of glass formed within said tubes.

Preferably, there is one of the openings 17 formed one-half on the upper end of each tube and half on the lower end of the tube immediately above, to the end that the transverse score may come opposite the ends of the pair of tubes and, when the sheet of glass has been drawn upward above the top of the framework of the machine, the same is bent sidewise and a section of the sheet thus cracked off. This lateral bending action may be accomplished manually or by any suitable mechanical means, the particular mechanism for accomplishing this result not forming a part of the present invention. In addition to the transverse score on the sheet at the ends of the tubes, the revolution of the transverse scoring blades 28, may be so timed as to produce one or more transverse scores intermediate the ends of the tubes, in which event the tubes will be provided with openings 17 intermediate the ends and correspondingly positioned.

*Longitudinal scoring devices.*—On opposite sides of the sheet, immediately above the transfer scoring devices and adjacent to the two edges of the sheet, are placed pairs of longitudinal scoring devices, one pair for each edge. Referring to Figs. 1, 2 and 10, 34—34 are two oppositely-disposed levers, each mounted on a vertical pivot 35—35, carried by lugs 36—36, bolted to the framework of the machine. On the inner ends of the levers 34 are mounted rotatable scoring disks 37—37, which disks are held in scoring contact with the glass by means of springs 38—38, as will be clearly understood from an inspection of Fig. 10.

As the drawn sheet of glass, while still in a plastic condition, is advanced past and between the scoring disks 37—37, the same act to form longitudinal scores 39 adjacent to the edge portions of the sheet.

Referring to Figs. 1 and 7, the tubes 13 are guided in their upward movement above the drawing pot 2 by suitable guide rolls 40, preferably positioned in pairs as illustrated in Fig. 1. The specific construction of these guide rolls will be best understood from an inspection of Fig. 7. The rolls 40—40 are each mounted on a shaft 41, passing through a sleeve 42, which sleeve is mounted to turn about a vertical pivot 43 carried by a lug 44 bolted to the framework of the machine. The two oppositely-disposed sleeves 42 have a spring 45 interposed between them at their outer ends, which spring tends to force said ends of the sleeve apart and thereby force the rolls 40—40 toward each other. The rods 41 at their outer ends are each provided with a washer or abutment 46 and interposed between said abutments and the outer ends of the sleeves 42 are springs 47. This construction insures a firm grasp of the tubes 13 by the roller 40 under the influence of the spring 45, and it also permits the tubes to be slightly inclined inward from the vertical through the yielding action of the springs 47. This inward inclination of the tubes compensates for the shrinkage of the glass as it cools.

Referring to Figs. 1 and 8, the guide rods 6—6 each have, on the portions thereof just below the drawing pot, two inwardly projecting fins 48, provided with rack teeth. These fins project through a vertical slot in a post 49, which serves to prevent the rods 6 from having any turning movement. Mounted in brackets 50, secured to the framework of the machine, are pinions 51 engaging the racks on the fins 48, said pinions being secured to stub shafts, to which crank levers 52 are secured. Said crank levers are connected together by a link 53, and one of these crank levers 52 is also connected by a link 54 with the lower end of a lever 55 fulcrumed at 56 in a bracket on the framework of the machine. Referring to Fig. 1, if the lever 55 is grasped and thrown to the left, the result would be to operate the pinions 51 so as to elevate the rods 6, moving the upper end of said rods above the glass level in the tank 2, and thereby stopping the flow of glass into the slots of the slotted tubes 13.

*Operation.*—In operation, the molten glass in the pot 2 having been brought to the desired consistency, a pair of tubes 13 are opened and placed around the rods 6, with their lower ends resting on the follower 9 and the weight 12 free to elevate the tubes, the latter being guided in this operation by the rollers 18. As soon as the tubes reach the pinions 22, the latter engage the racks on the sides of the tubes, and the follower 9 is then lowered to receive another pair of tubes, which are elevated under the influence of the weight 12, with their upper ends in contact with the lower ends of the first pair of tubes. As soon as the tubes reach overflow lips 3 of tank 2, lever 55 is operated, being thrown from left to right in Fig. 1 so as to lower rods 6 and thus permit the free flow of the glass from overflow lips 3 into tubes 13 through the slots thereof. Pins 26 on bait 25 enter the upper ends of the tubes and, as the latter are elevated under the influence of pinions 24, the bait is slowly raised, a sheet of glass following the same. The engagement of the glass within the interior of tubes 13 prevents the narrowing of the sheet during the drawing operation. As the sheet passes the transverse scoring plates 28, the latter, in their revolution, act to transversely score the sheet, the plates being revolved in a direction so that the two move upward with the sheet, as indicated by the arrows in Fig. 2. Immediately after passing the transverse scoring devices, the edge portions of the sheet are engaged by longitudinal scoring devices 37 and longitudinal scores formed adjacent to each edge of the sheet. During this operation the sheet is guided between the rolls 40—40 and, as the sheet gradually cools and hence contracts, these rolls yield in order to permit tubes 13 to move slightly inward.

The sheet having been drawn to a point above the framework of the machine, the bait is removed in any suitable manner, as by cutting the glass immediately below the bait, after which the drawing action is maintained by the engagement of the edges of the sheet with the lateral slotted tubes 13. The sheet is then bent laterally and cracked off at the bottom of a pair of slotted tubes, and the slotted tubes being removed, the beaded edge portions are also cracked off and the sheet removed for delivery to a leer for annealing.

It will be observed that by the use of this apparatus, the drawing of the sheet is continuous, the upper sections being broken off and removed as the drawing operation continues, and that the transverse and longitudinal scoring is performed automatically and at a time when the glass is plastic, whereby fracture of the sheet by the scoring devices is avoided.

Modifications of the specific construction herein shown, which will not depart from the principle of the invention, will readily suggest themselves to those skilled in the art, and such modifications are designed to be covered by the claims herein.

Having thus described my invention, what is claimed is:

1. In a sheet glass drawing mechanism, the combination of a receptacle containing molten glass, with a series of vertically-moving width-maintaining devices on opposite sides of said receptacle removably engaging the edges of the sheet at the formative point.

2. In a sheet glass drawing mechanism, the combination of a pot receiving a mass of molten glass, overflow lips at the opposite sides of said pot, and vertically disposed channels receiving and engaging the overflow from said lips.

3. In a sheet glass drawing mechanism, the combination of a pot receiving a mass of molten glass and having oppositely disposed overflow-portions, with vertically moving channels receiving and engaging the overflow from said overflow-portions.

4. In a sheet glass drawing mechanism, the combination of a pot receiving a mass of molten glass and having oppositely-disposed overflow portions, with vertically moving slotted tubes, and means moving said tubes past said overflow portions with the slots adjacent thereto.

5. In a sheet glass drawing mechanism, the combination of a pot containing a mass of molten glass and having oppositely disposed overflow portions below the glass, vertically moving slotted tubes, and means moving said tubes past the said overflow portions with their slots adjacent to and receiving said overflow.

6. In a sheet glass drawing mechanism, the combination of a pot containing a mass of molten glass and having oppositely-disposed discharge portions below the glass level, vertically moving slotted tubes composed of longitudinal sections hinged together, and means moving said tubes past the said channels.

7. In a sheet glass drawing mechanism, the combination of a pot containing a mass of molten glass and having oppositely-disposed discharge portions below the glass level, temperature regulating means in operative relation with said portions, slotted tubes composed of longitudinal sections hinged together, means moving said tubes past said portions with their slots adjacent thereto, and transverse glass scoring devices.

8. In a continuous sheet glass drawing machine, the combination of a receptacle for molten glass having oppositely disposed overflow portions, and sheet drawing and width maintaining means comprising a series of edge-forming devices movable vertically past each of the overflow portions, for forming the sheet edges and holding them out laterally while simultaneously drawing the sheet upward.

9. In a continuous sheet glass drawing machine, the combination of a receptacle for molten glass having oppositely disposed overflow portions, sheet drawing and width maintaining means, comprising a series of edge forming devices moving upwardly past each overflow portion, within which the edges of the sheet are formed and retained, and means for transversely scoring the sheet at the ends of each pair of edge forming devices, whereby the sheet sections may be cracked off with the forming devices attached thereto.

10. In a continuous sheet glass drawing machine, the combination of a receptacle for molten glass having oppositely disposed overflow portions, sheet drawing and width maintaining means, comprising a series of edge forming devices movable upwardly past each overflow portion, within which the edges of the sheet are formed and retained, revolving means for transversely scoring the sheet on a line with the ends of each pair of edge forming devices, and common driving means for moving the edge forming devices upwardly and revolving the transverse scorer.

11. In a sheet glass drawing mechanism, the combination of a pot containing a mass of molten glass and having oppositely-disposed discharge portions below the glass level, and vertically moving longitudinally slotted tubes having transverse openings therein, with glass scoring mechanism entering said openings and scoring the glass within said tubes.

12. In a sheet glass drawing mechanism, the combination of a pot containing a mass of molten glass and having oppositely-disposed discharge portions below the glass level, and vertically moving longitudinally slotted tubes having transverse openings therein, with transverse glass scoring mechanism entering said opening, and longitudinal glass scoring devices.

13. In a sheet glass drawing mechanism, the combination of a pot containing a mass of molten glass and having oppositely-disposed discharge portions below the glass level, vertically moving longitudinally slotted tubes, means moving said tubes past said portions, and yielding guide devices for said tubes.

14. In a sheet glass drawing machine, the combination of a pot containing a mass of molten glass and having oppositely-disposed discharge portions below the glass level, vertically-moving longitudinally slotted tubes provided with roughened interior surfaces, and means moving said tubes past said portions.

In testimony whereof I have signed this specification.

CLARENCE A. RHONEMUS.